US011621582B1

(12) United States Patent
Epstein

(10) Patent No.: US 11,621,582 B1
(45) Date of Patent: Apr. 4, 2023

(54) MOBILE ACCESSORY WIRELESSLY POWERED BY MOBILE DEVICE

(71) Applicant: Jacob Epstein, Concord, MA (US)

(72) Inventor: Jacob Epstein, Concord, MA (US)

( * ) Notice: Subject to any disclaimer, the term of this patent is extended or adjusted under 35 U.S.C. 154(b) by 0 days.

(21) Appl. No.: 17/941,964

(22) Filed: Sep. 9, 2022

Related U.S. Application Data

(60) Provisional application No. 63/349,814, filed on Jun. 7, 2022, provisional application No. 63/242,759, filed on Sep. 10, 2021.

(51) Int. Cl.
*H01M 10/44* (2006.01)
*H01M 10/46* (2006.01)
*H02J 50/00* (2016.01)
*H02J 50/10* (2016.01)

(52) U.S. Cl.
CPC ............ *H02J 50/005* (2020.01); *H02J 50/10* (2016.02)

(58) Field of Classification Search
CPC ......... H02J 7/0042; H02J 50/005; H02J 50/10
USPC ................................ 320/107, 108, 114, 115
See application file for complete search history.

(56) References Cited

U.S. PATENT DOCUMENTS

| 8,428,644 | B1 | 4/2013 | Harooni |
| 9,086,610 | B2 | 7/2015 | Shoemake et al. |
| 9,110,355 | B1 | 8/2015 | Nourbakhsh |
| 9,946,317 | B2 | 4/2018 | Backman et al. |
| 10,054,259 | B2 | 8/2018 | Hobbs et al. |
| 10,503,205 | B2 | 12/2019 | Spevak |
| 2012/0189146 | A1 | 7/2012 | Wuidart |
| 2014/0085815 | A1 | 3/2014 | Filipovic et al. |
| 2016/0294225 | A1 | 10/2016 | Blum et al. |
| 2016/0372973 | A1 | 12/2016 | Fitzgerald et al. |
| 2017/0094392 | A1* | 3/2017 | Zörkendörfer ......... A45C 13/02 |
| 2017/0324438 | A1 | 11/2017 | Mischel |
| 2018/0014172 | A1 | 1/2018 | Baldree |
| 2018/0161594 | A1 | 6/2018 | Yehezkel |
| 2018/0219386 | A1 | 8/2018 | Zhang |
| 2020/0144860 | A1 | 5/2020 | Lee et al. |

(Continued)

FOREIGN PATENT DOCUMENTS

| CN | 210201887 U | 3/2020 |
| CN | 210201912 U | 3/2020 |

(Continued)

OTHER PUBLICATIONS

International Search Report and Written Opinion for International Application No. PCT/US2022/043126, dated Jan. 24, 2023, 21 pages.

*Primary Examiner* — Edward Tso
(74) *Attorney, Agent, or Firm* — Nutter McClennen & Fish LLP

(57) ABSTRACT

A method provides a mobile device positioned in a case. The mobile device has a wireless power transmitter. The case has a magnetically attractive portion. A mobile accessory having a magnetic coupling portion and a wireless power receiver is provided. The mobile accessory includes a functional component. The accessory is coupled with the case such that the wireless power transmitter of the mobile device is positioned to transfer wireless power to the wireless power receiver of the accessory. Power is wirelessly transmitted from the mobile device to the accessory. The functional component of the accessory is activated while power is transferred wirelessly.

21 Claims, 16 Drawing Sheets

(56) References Cited

U.S. PATENT DOCUMENTS

2021/0301976 A1 9/2021 Cohen
2022/0120380 A1 4/2022 Epstein et al.

FOREIGN PATENT DOCUMENTS

WO  2020027940 A1  2/2020
WO  2020091904 A1  5/2020

\* cited by examiner

MOBILE ACCESSORY WIRELESSLY POWERED BY MOBILE DEVICE

PRIORITY

This patent application claims priority from provisional U.S. patent application No. 63/242,759, filed Sep. 10, 2021, and provisional U.S. patent application No. 63/349,814, filed Jun. 7, 2022, both naming Jacob Epstein as inventor, the disclosures of which are incorporated herein, in their entireties, by reference.

FIELD OF THE INVENTION

Illustrative embodiments generally relate to accessories for a mobile device, and more particularly, to mobile accessories that add functionality or utility to the mobile device.

BACKGROUND OF THE INVENTION

Many people use their mobile devices for hours every day for work and entertainment. Mobile devices are used to make phone calls, listen to music, watch tv shows, and other typical mobile device functions.

SUMMARY OF VARIOUS EMBODIMENTS

In accordance with one embodiment of the invention, a method uses a mobile accessory. The method provides a mobile device positioned in a case. The mobile device has a wireless power transmitter. The case has a magnetically attractive portion. A mobile accessory having a magnetic coupling portion and a wireless power receiver is provided. The mobile accessory includes a functional component. The accessory is coupled with the case such that the wireless power transmitter of the mobile device is positioned to transfer wireless power to the wireless power receiver of the accessory. Power is wirelessly transmitted from the mobile device to the accessory. The functional component of the accessory is activated while power is transferred wirelessly.

In various embodiments, the functional component includes a sound transducer or a light source, such as an LED. Among other things, the functional component may include an air purifier, alarm clock, speaker, digital camera, camera lens, drill, heating element (e.g., electric grill or stove), cooling element, pencil sharpener, electric razor, exhaust fan, external hard drive, fan, game controller (e.g., joystick or handheld controller), printer (e.g., 3D or inkjet), clothing iron, digital scale, microphone, piano keys, display, and/or sensors.

In various embodiments, coupling the accessory with the case includes coupling the magnetic coupling portion of the accessory with a corresponding magnetic coupling portion of the mobile device. The magnetic coupling portion of the accessory and/or the corresponding magnetic coupling portion may be magnetically attractive. In some embodiments, however, an adhesive is used to couple the accessory with the case.

In various embodiments, the accessory 1 is batteryless. The accessory 1 may have a thickness of less than 10 millimeters. The accessory may have a weight of less than 2 ounces. In some embodiments, the accessory 1 may have a thickness of less than 6 mm, and/or a weight of less than 1 ounce. Thus, as the accessory is coupled with the mobile device, a user may use the mobile device normally as the functional component of the accessory is activated.

The wireless accessory may provide powerful functional components. In some embodiments, the functional component has a power rating of between 0.25 watts and 25.00 watts.

In accordance with another embodiment, a method uses a mobile accessory. The method provides a mobile device having a wireless power transmitter and a corresponding magnetic coupling portion. A mobile accessory having a magnetic coupling portion and a wireless power receiver is provided. The mobile accessory has a functional component. The accessory is coupled with the mobile device such that the wireless power transmitter of the mobile device is positioned to transfer wireless power to the wireless power receiver of the accessory. Power is transferred wirelessly from the mobile device to the accessory. The functional component of the accessory is activated while power is transferred wirelessly.

In accordance with yet another embodiment, a mobile accessory includes a magnetic coupling portion configured to couple with a magnetically attractive portion of a case of a mobile device. A wireless power receiver is configured to be positioned relative to a wireless power transmitter of the mobile device when the magnetic coupling portion is coupled with the magnetically attractive portion of the case, such that the wireless power receiver receives wireless power from the mobile device.

In some embodiments, the accessory is batteryless. However, in some other embodiments, the accessory has a battery of less than 100 mAh.

In accordance with yet another embodiment, a mobile accessory includes a coupling portion configured to physically couple and uncouple with a mobile device or a case of a mobile device. A wireless power receive coil is configured to receive wireless power from the mobile device. A functional component is configured to perform a function. The functional component is configured to perform the function while coupled and receiving wireless power from the mobile device.

In various embodiments, the accessory is configured to magnetically couple with the mobile device. However, the accessory may be configured to stick to the mobile device or a case of the mobile device with an adhesive. Additionally, or alternatively, accessory may be configured to mechanically attach to the mobile device or a case of the mobile device. The accessory may have an overall thickness of less than 6 mm. In some embodiments, the accessory may include a function housing configured to operate as a collapsible or expandable grip.

Some embodiments include a method of operating an accessory. The method provides an accessory including a functional component configured to perform an electrically powered function. The accessory includes a wireless power receive coil configured to receive power from a mobile device. The accessory also includes a coupling portion for coupling with a mobile device. The accessory is physically coupled with mobile device or a case of the mobile device using the coupling portion of the accessory. The accessory is electrically coupled with the mobile device using the wireless power receive coil. The electrically powered function is performed while receiving power from the mobile device and while coupled with the mobile device or the case of the mobile device.

In accordance with yet another embodiment, a system includes a mobile device a wireless power transmitter and a magnetically attractive portion. The system includes a mobile accessory having a magnetic coupling portion and a wireless power receiver. The wireless accessory has a functional component. The mobile device and the mobile accessory are configured to be coupled together such that the wireless power transmitter of the mobile device is positioned to transfer wireless power to the wireless power receiver of the accessory.

In some embodiments, the system includes a case of a mobile device. The case may have a magnetically attractive portion.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a wirelessly chargeable device (also referred to as a wireless accessory) is physically coupled to a mobile device or a case of the mobile device, and receives power wirelessly from the mobile device. When powered by the mobile device, the wireless accessory provides an electrically powered function, which adds new or improved utility to the mobile device. The mobile device charges the accessory, and therefore, the accessory does not require a battery. Accordingly, the wireless accessory may have a thin and/or lightweight formfactor that allows the mobile device to be actively used while coupled with the wireless accessory, rather than merely functioning as a charging station. Details of illustrative embodiments are discussed below.

Various embodiments of the wireless accessory include an attachable flashlight, which is used most often as an example below and in the figures. However, it should be understood that various embodiments are not limited to an attachable flashlight accessory, and that the example of the attachable flashlight is used for discussion purposes. One skilled in the art can envision a number of different wireless accessories that may be used in conjunction with a mobile device as described herein. Although shown as a mobile phone, the mobile device may include a phone, a watch, a tablet, and/or laptop computer, among other things. The mobile device may also be referred to as an electronic device. Furthermore, although illustrative embodiments refer to a mobile device accessory, it should be understood that various embodiments may be used with non-mobile devices.

Figure 1A:
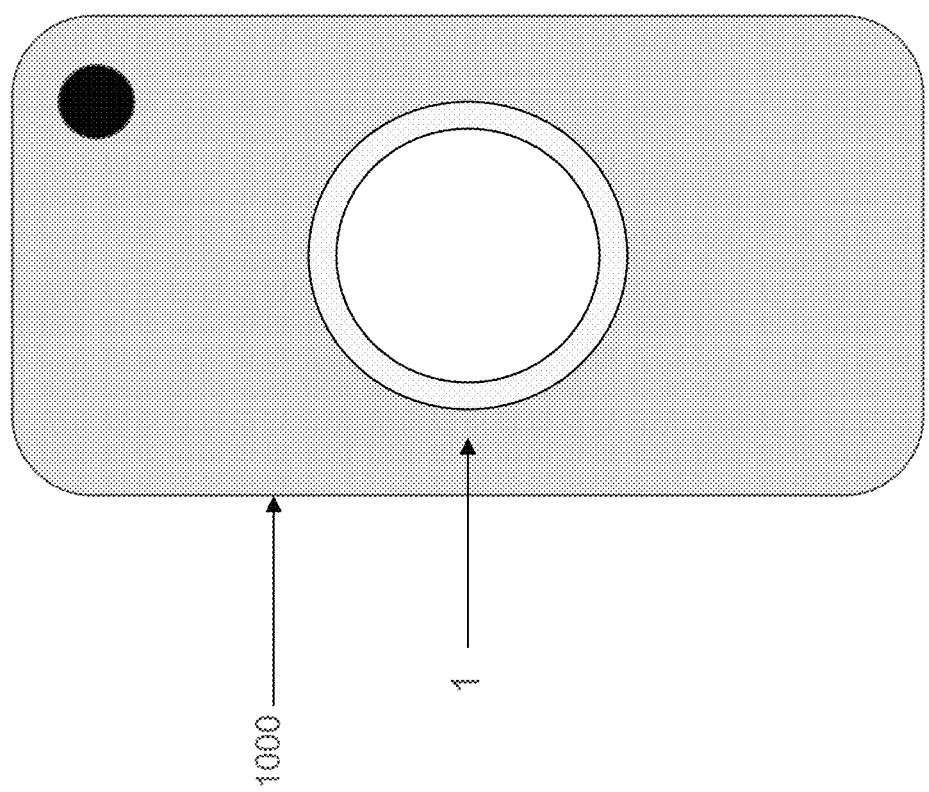
FIG. 1A shows a rear view of a mobile device coupled with a wireless accessory in accordance with illustrative embodiments.

FIG. 1A schematically shows the wireless chargeable accessory 1 coupled with the mobile device 1000 in accordance with illustrative is embodiments. Specifically, the wireless accessory 1 is coupled to the back of the mobile device 1000 or a case of the mobile device 1000. The accessory 1 may be wirelessly charged by the mobile device 1000 (e.g., using inductive charging). Users carry these mobile devices 1000 with them every day and occasionally use the small included "flashlight" function (usually a repurposing of the camera flash) in order to illuminate dark spaces. Having a small flashlight embedded within the mobile device 1000 is certainly useful, but is dramatically underpowered in many instances where a large bright flashlight is desirable.

Because the flashlight, and other peripheral functions (e.g., speaker system), are not the primary functions of the mobile device 1000, these peripheral functions often underperform higher quality standalone devices (e.g., a standalone flashlight). In contrast, more powerful flashlights are used by many people when camping, working, boating, etc. These standalone flashlights are typically very bright and can last hours, but are bulky and heavy, so they are typically left in a car, backpack, boat, etc. Illustrative embodiments provide a lightweight and powerful functional component that is comparable to a standalone device, such as a thin accessory light that is comparable to standalone flashlights.

Meanwhile, although electronic elements have become incredibly small over the past several decades, batteries remain relatively thick and bulky compared to the electronics they power. Mobile devices 1000 include very large batteries to power their functionality for many hours of use. Illustrative embodiments advantageously provide an attachable accessory 1 with an added electronic functionality that uses the battery power of the mobile device 1000. Advantageously, illustrative embodiments negate the need for an internal accessory 1 battery, and accordingly, keep the attachable accessory 1 very thin and/or lightweight.

Illustrative embodiments therefore provide a very thin mobile accessory 1 that couples to the mobile device 1000 (e.g., the back of the mobile device 1000), and that provides new or improved functionality over integrated peripheral utility features of the mobile device 1000 (e.g., integrated camera flashlight). Furthermore, illustrative embodiments utilize the battery power of the mobile device 1000 to ensure the accessory 1 is thin and easily handled, allowing the mobile device 1000 to be actively and easily used while coupled with the accessory 1.

Figure 1B:
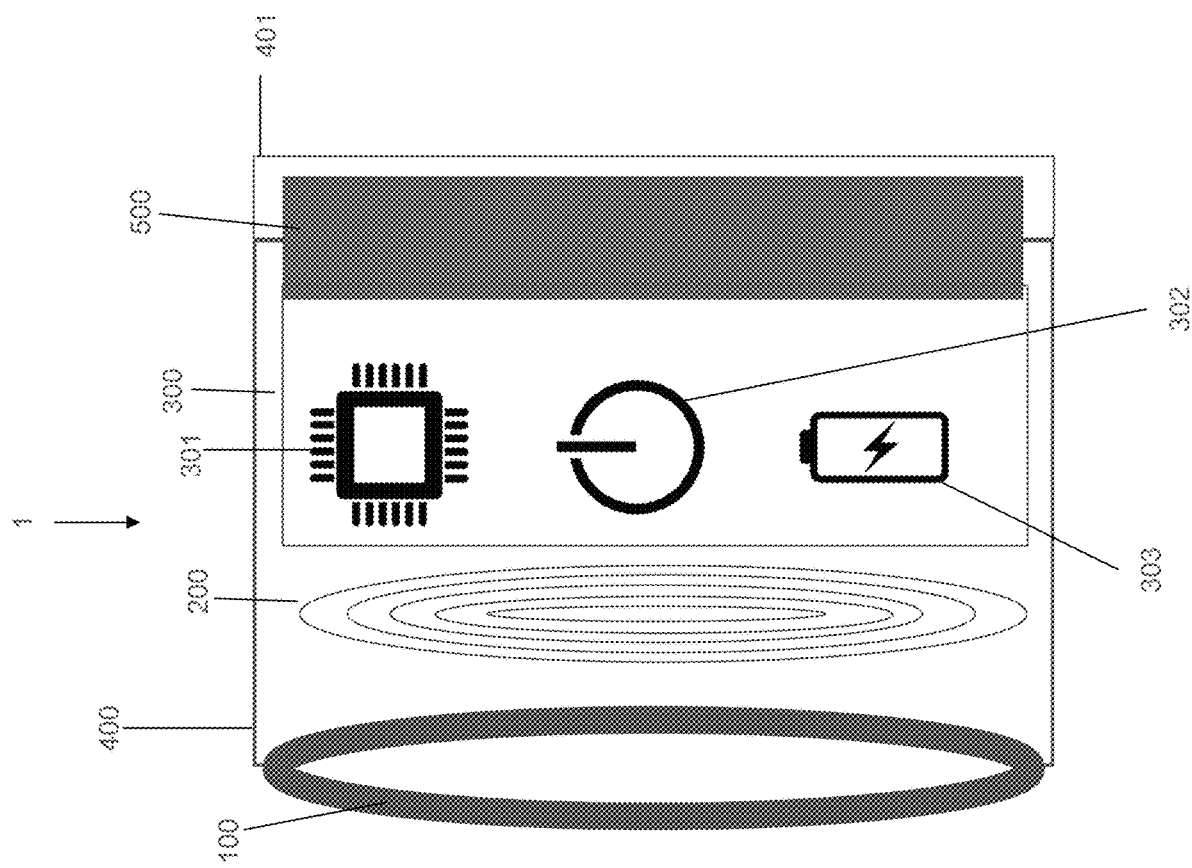
FIG. 1B shows a schematic diagram of a wireless accessory in accordance with illustrative embodiments.

FIG. 1B is a schematic diagram of the wireless accessory 1 in accordance with illustrative embodiments. A coupling 100, also referred to as a coupling portion 100, (e.g., a ring of magnets, a microsuction cup) may be used to physically couple the wireless accessory 1 to the mobile device 1000 or the case of the mobile device 1000 (e.g., to a corresponding magnetically attractive portion in the case or mobile device 1000). A wireless power receiver, such as a receiver coil 200, is used for receiving electromagnetic energy from the mobile device 1000. Advantageously, in various embodiments, power received wirelessly from the mobile device 1000 to the receiver coil 200 is sufficient to power the wireless accessory 1 independently of a separate power source. In various embodiment, the receiver coil 200 may also be a dual mode antenna. The dual mode antenna may be used to receive power in a receive mode, and may then transmit power in a transmit mode. In various embodiments, the receiver coil 200 can be thin (e.g., about 1 mm or less). Some embodiments may include an electromechanical connection for receiving power.

A controller 301, such as a microcontroller, may administer the electrical and digital functionality of the wireless accessory 1. The controller 301, which may be positioned inside the wireless accessory 1, may be powered by the mobile device 1000. However, the controller 301 may in turn control or gate the power of the other functional component 500 of the accessory 1. For example, the controller 301 may act as a Bluetooth receiver that turns on the speaker when enabled by a connected Bluetooth device (e.g., by a user through a software application). Additionally, or alternatively, the controller 301 may be connected to one or more switches or buttons 302 (referred to generically as a mechanical enablement) that may be used to power on or off, or otherwise control, the behavior of the wireless accessory 1. For example, the controller 301, in conjunction with buttons 302, may control a flashlight function where each press of the button 302 changes the brightness.

An energy cache 303, such as a capacitor or small battery (e.g., 100 mAh) may be used to power the wireless accessor 1 for very short periods of time (e.g., when the receiver coil 200 is not receiving power). However, in various embodiments, the accessory 1 does not have a battery (i.e., a battery-less device). The accessory 1 may rely solely on receiving power wirelessly from the device 1000 to actively power operation of the accessory 1. Functional component 500 represents the one or more components that provide the specific accessory functionality, for example lights of a flashlight embodiment of the wireless accessory 1. A printed circuit board (PCB) 300 can be used to electrically connect the different components of the wireless accessory 1. Finally, there may be one or more housings to the wireless accessory 1. In various embodiments, an outer housing 400 encapsulates and mechanically connects the various components of the accessory 1. In some embodiments, the functional component 500 may be exposed in the outer housing 400, or may extend from the outer housing 400.

A function housing 401 may retain and/or enclose the functional component 500. In various embodiments the function housing 401 is configured to house the functional component 500 and to enhance or reduce the attenuation of the function of the functional component 500. For example, if the functional component 500 is a light source, the function housing 401 may include a light diffuser. As another example, if the functional component 500 is a speaker, the function housing 401 may include a speaker cone. Furthermore, in various embodiments, the function housing 401 may couple with the outer housing 400 to house the internal components.

Figure 2:
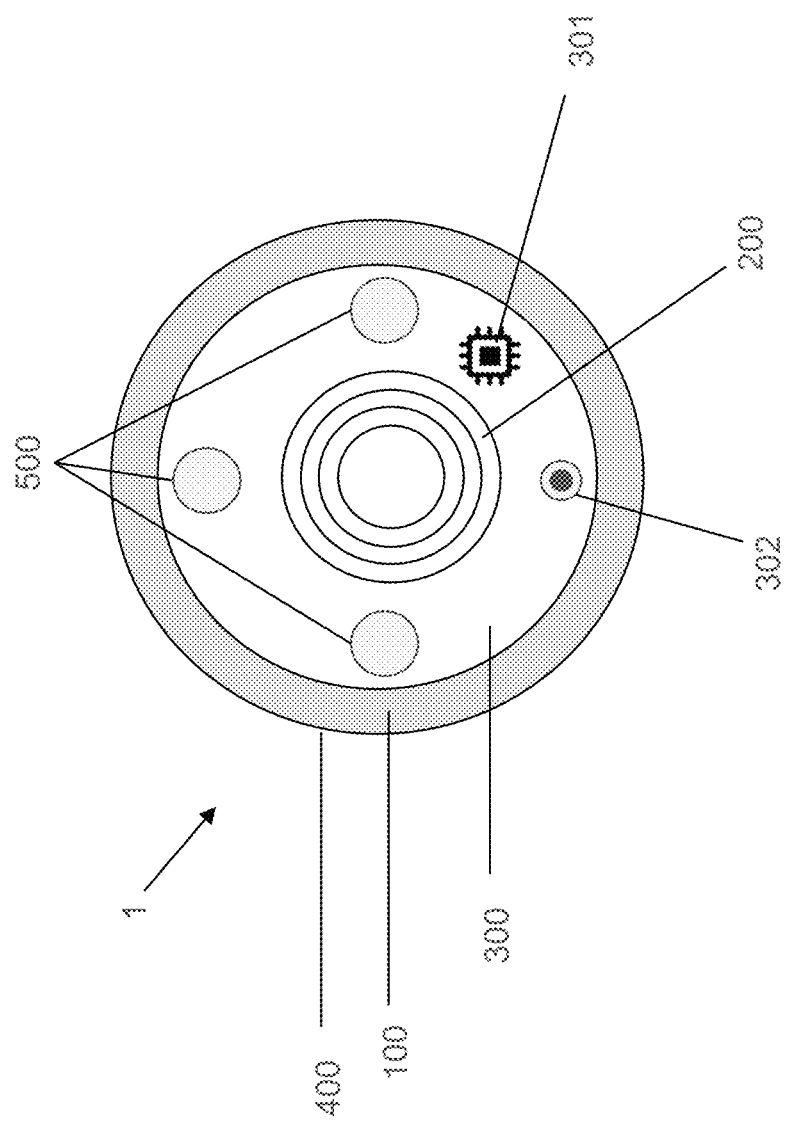
FIG. 2 shows a top cutoff view of a wireless accessory in accordance with illustrative embodiments.

FIG. 2 shows a cutoff top view of the wireless accessory 1 in accordance with various embodiments. In the example of FIG. 2, the wireless accessory 1 is configured to provide flashlight utility (e.g., even when the mobile device 1000 already has a camera flash/light). Accordingly, the functional component 500 may include one or more (e.g., a set of three) LEDs facing outwardly. The coupling 100 may include, among other things, a magnetic ring around the perimeter of the accessory 1. The receiver coil 200 may be positioned in the center of the accessory 1. As shown, the accessory 1 may also include the button 302 (e.g., on/off button) and the controller 301. The magnetic ring preferably keeps the coupling portion of the accessory 1 thin and reduces the overall footprint of the accessory 1. Illustrative embodiments advantageously provide a minimal thickness phone accessory 1 that can be easily coupled to the mobile device 1000 and carried in order to create a bright light when needed.

Figure 3:
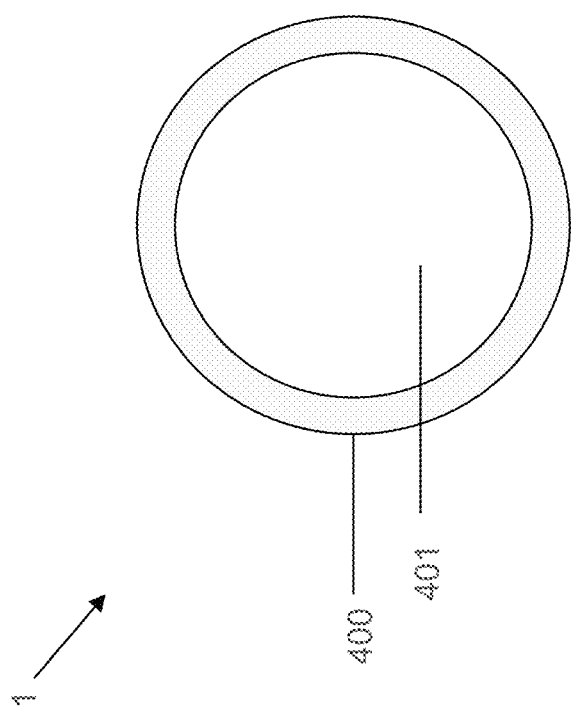
FIG. 3 shows a top view of a wireless accessory in accordance with illustrative embodiments.

FIG. 3 shows a top view of the wireless accessory 1 shown in FIG. 2. In this figure, which is not a cutoff view, all that may be visible to a user is the outer housing 400 and the function housing 401 (e.g., a light diffuser). As an example, the light from the underlying functional component 500 passes through the function housing 401 (e.g., the diffuser), which may spread the light and also protect the internal electrical components from damage. In some embodiments, the coupling 100 is positioned under the function housing 401. Alternatively, the coupling 100 may be visible from the top view. In various embodiments, all of the aforementioned components may be anchored to the outer housing 400, which keeps the wireless accessory 1 together.

Figure 4:
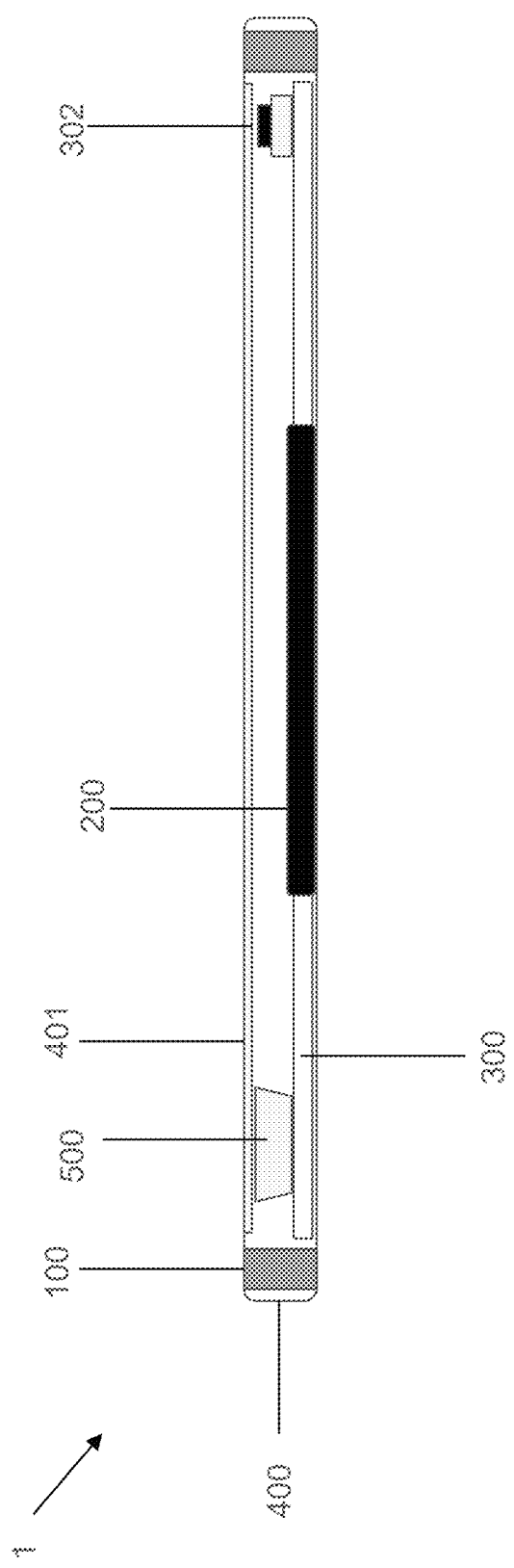
FIG. 4 shows a cutoff side view of a wireless accessory in accordance with illustrative embodiments.

FIG. 4 shows a cutoff side view of the wireless accessory 1 of FIGS. 2 and 3. As shown, the wireless accessory 1 may have a thin profile. The components of the wireless accessory 1, including the receiver coil 200, functional component 500 (e.g., lights), the button 302, and/or the magnets for the coupling 100 can be extremely low profile parts mounted to a thin PCB 300. Accordingly, in various embodiments, the entire accessory 1 may desirably have a thickness of less than about 10 mm thick, preferably less than 6 mm thick. It should be apparent from FIG. 4 that various embodiments may provide an extremely thin/low-profile accessory 1, such that an overall thicknesses of less than about 2 mm may be achieved.

Figure 5:
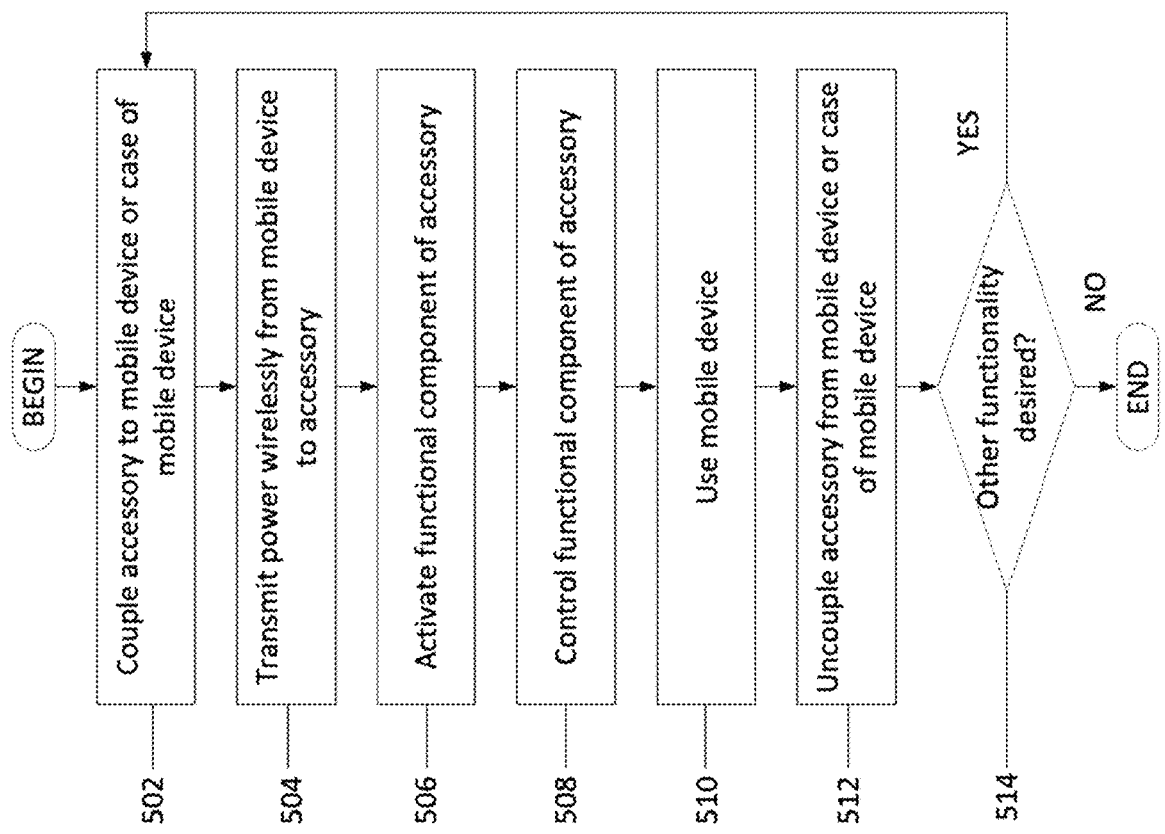
FIG. 5 shows a process of using a wireless accessory in accordance with illustrative embodiments of the invention.

FIG. 5 shows a process of using the accessory 1 in accordance with illustrative embodiments of the invention. The process begins at step 502, where a user selects the accessory 1 and couples the accessory 1 to the mobile device 1000 or the case of the mobile device 1000. For example, the user may wish to have additional flashlight functionality. Accordingly, the user selects the accessory 1 having at least flashlight functionality. Additionally, or alternatively, the user may wish to have other functionality, such as an added speaker. In various embodiments, the accessory 1 may include one or more of a variety of functional components 500.

Figure 6:
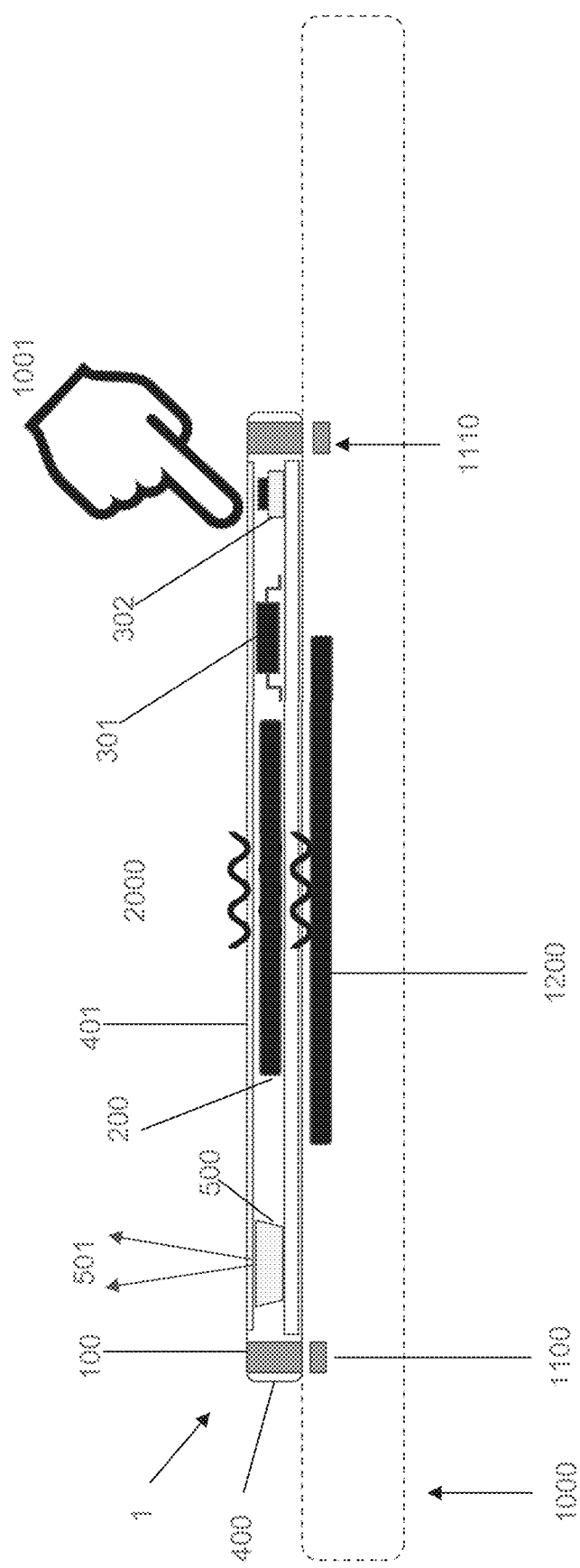
FIG. 6 shows a cutoff side view of a wireless accessory coupled with a mobile device using magnets in accordance with illustrative embodiments.

FIG. 6 shows a cutoff side view of the wireless accessory 1 coupled to the mobile device 1000 in accordance with illustrative embodiments. To couple the accessory 1 with the mobile device 1000, the wireless receiving coil 200 is substantially aligned with the wireless transmit coil 1200 of the mobile device 1000. In some embodiments, the wireless transmit coil 1200 may also be a dual-mode antenna (i.e., capable of wireless receive or wireless transmit). The accessory 1 and the mobile device are then positioned against one another and coupled together using the coupling 100. In some embodiments, the mobile device 1000, the case of the mobile device 1000, and/or the accessory 1 may include markings and/or indicators for helping the user to properly align the accessory 1 relative to the mobile device 1000 (e.g., properly align the wireless receive coil 200 relative to the wireless transmit coil 1200). Some embodiments may include a corresponding coupling portion 1110 on the mobile device 1000 and/or the case of the mobile device 1000 that is configured to properly align with the coupling portion 100 of the accessory 1. For example, some embodiments may include a projecting coupling 100 that fits into a corresponding coupling portion 1110.

In various embodiments, the wireless receive coil 200 at least partly overlaps with the wireless transmit coil 1200 when they are substantially aligned, such that the coils 200 and 1200 maintain a partial overlap when the mobile device 1000 or case are coupled with the accessory 1. Preferably, the wireless receive coil 200 and the wireless transmit coil 1200 are completely aligned, and the coupling 100 and the corresponding coupling portion 1110 are configured to maintain the alignment.

As discussed previously, the coupling 100 may include a ring of magnets. The magnets may be attracted to the corresponding coupling portion 1110, which may include oppositely polarized embedded magnets 1100 available on some mobile devices 1000 (e.g., those including Apple MagSafe). Although not shown in the figure, the coupling 100 may be formed as a magnetic ring that is magnetically attracted to a ferromagnetic plate, ferromagnetic ring, or another magnetic ring which was placed within, on or under the mobile device 1000 case (e.g., if the mobile device 1000 did not have the embedded magnets 1100). Indeed, in the case of Apple MagSafe, both the mobile device 1000 and its case typically have magnetic attractive portions. Various embodiments may also couple to the case of the mobile device 1000, instead of directly to the mobile device 1000. Various embodiments may receive power wirelessly through the case of the device 1000. Furthermore, the coupling portion 100 may be configured to couple with the standard Apple MagSafe coupling (e.g., by being sized accordingly).

Figure 7:
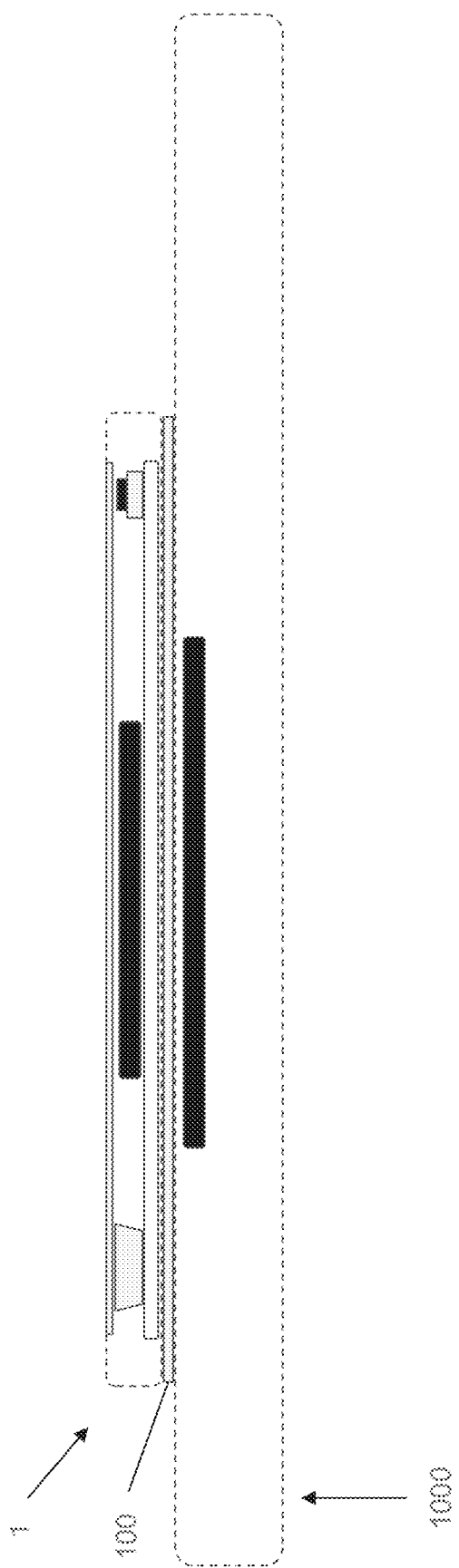
FIG. 7 shows a cutoff side view of a wireless accessory coupled with a mobile device using adhesive in accordance with illustrative embodiments.
Figure 8:
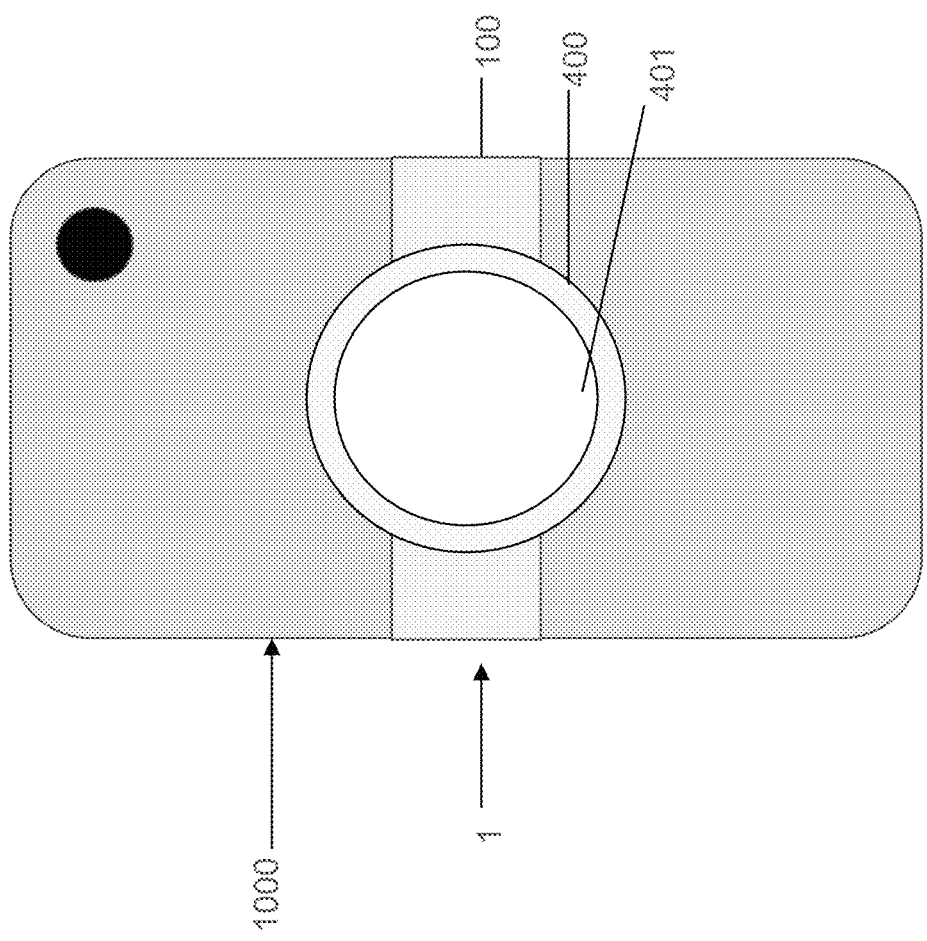
FIG. 8 shows a cutoff side view of a wireless accessory coupled with a mobile device in accordance with illustrative embodiments.

In various embodiments, the coupling 100 may include additional or alternative coupling mechanism. For example, FIG. 7 is similar to FIG. 6, but shows an alternative embodiment of the wireless accessory 1 that uses an adhesive as the coupling 100 (e.g., rather than magnets) in accordance with illustrative embodiments. As yet another example, FIG. 8 shows an alternative embodiment of the wireless accessory 1 that uses a strap or clamp as the coupling 100 to mechanically attach to the mobile device 1000 (e.g., rather than magnets) or a case of the mobile device in accordance with illustrative embodiments. Accordingly, one skilled in the art should appreciate that the accessory 1 may be coupled to the mobile device 1000 or the case of the mobile device 1000 in various ways. In some embodiments, the accessory 1 may be formed as a unitary piece with the case of the mobile device 1000. In such embodiments, the fit of the case around the mobile device 1000 defines the coupling 100.

The process then proceeds to step 504, which transmits power wirelessly from the mobile device 1000 to the accessory 1. Returning to FIG. 6, the mobile device 1000 and the accessory 1 are wirelessly coupled (e.g., the transmit coil 1200 is positioned to transmit power to the receive coil 200). Electromagnetic energy 2000 passes from the transmit coil 1200 of the mobile device 1000 to the receiver coil 200 inside the wireless accessory 1. Mobile devices 1000 are sometimes designed to perform this function (known as "reverse charging") in order to charge other devices (e.g., headphones or another phone). In the case of the flashlight wireless accessory 1, the energy is converted into visible light 501. However, it should be understood that the wireless accessory 1 may have additional or alternative functionalities.

The process then proceeds to step 506, which activates the functional component 500 of the accessory 1 (e.g., as the accessory 1 is powered by the mobile device 1000). In some embodiments, the user 1001 may activate the functional component 500 as the accessory 1 receives power wirelessly, so that the accessory 1 is not continuously drawing power. For example, the user may active the accessory 1 as it receives power wirelessly by pressing the button 302 or controlling an on-off switch. Additionally, or alternatively, the user 1001 may activate the functional component 500 via the mobile device 1000 as the accessory 1 receives power wirelessly. In some embodiments, the accessory 1 may be turned on and off by sending a signal from the mobile device 1000 to the accessory 1. For example, an application on a smart phone 1000 may be used to control the operation of the accessory 1. To that end, the controller 301 may be configured to have a network communication connection with the mobile device 1000. For example, the controller 301 may be configured to include a Bluetooth connection or a wireless connection through which the accessory 1 may communicate with the mobile device 1000.

As an example, the LED functional component 500 may be activated to emit light 501 as the accessory 1 receives power wirelessly from the mobile device 1000. In this way, the accessory 1 may actively perform an electronic function/utility while coupled to and receiving power from the mobile device 1000.

The process then proceeds to step 508, which controls the functional component 500 of the accessory 1. For example, the user 1001 may control the brightness or the color of the emitted light using a control on the accessory 1, and/or via the mobile device 1000. Control through the mobile device 1000 may be accomplished by establishing communication between the accessory 1 and the mobile device 1000 (e.g., using Bluetooth).

Various external triggers may be used to control the operation of the accessory 1. For example, in some embodiments, the accessory 1 may include a transparent or semi-transparent portion (e.g., the function housing 401). When various actions occur, the LEDs functional components 5000 within the accessory 1 may light up different colors, or perform different functions. For example, the accessory 1 may be configured to light up a first color upon receiving a text message from a first person, a second color upon receiving a text message from a second person, etc. (e.g., blue for dad, red for mom, pink for significant other, etc.). The user 1001 may adjust the various settings through the mobile device 1000.

As another example, different activities within the mobile device may trigger various responses from the accessory 1. For example, detecting a low battery level of the device 1000 may cause the accessory 1 to perform a first function (e.g., flashing a light). As another example, receiving a call on the device 1000 may cause the accessory 1 to perform a function, such as lighting up a different color based on the identity of the caller.

As yet another example, the functional component 500 may include a speaker. The user 1001 may control the volume of the speaker through the mobile device 1000. Additionally, the user may change the sound coming out of the speaker. For example, the user 1001 may play a song from their mobile device 1000 (e.g., through Spotify). The user 1001 may change the song, and thus, change the output of the functional component 500.

It should be understood that various embodiments may operate with a variety of functional components 500. Accordingly, illustrative embodiments enable the user 1001 to adjust the output of the functional component 500 via the mobile device 1000.

It should be understood that various embodiments provide a lightweight and powerful functional component 500 that is comparable to a standalone dedicated device, such as a standalone flashlight. For example, the functional component 500 of the accessory 1 may have a power rating of greater than 0.25 watts, where the power rating, in watts, indicates the rate at which the accessory 1 converts electrical energy into another form of energy, such as light, heat, or motion. Accordingly, from the user's perspective, the power rating is a quantity that describes the total electrical power required for normal operation of the accessory 1. In some embodiments, the functional component of the accessory 1 may have a power rating of greater that 5.00 watts. Some embodiments may have a power rating of up to 25 watts, or greater.

Returning to FIG. 5, the process proceeds to step 510, where the user 1001 uses the mobile device 1000 for its normal functions while it is coupled with the accessory 1. In various embodiments, the accessory 1 may be activated as the mobile device 1000 is used. As an example, the accessory 1 may be playing music, and the user 1001 may go on their phone 1000 and text as the functional component 500 is active (i.e., the functional component 500 performs its function). Accordingly, in various embodiments, the user 1001 uses the mobile device 1000 while the accessory 1 is active.

Figure 9:
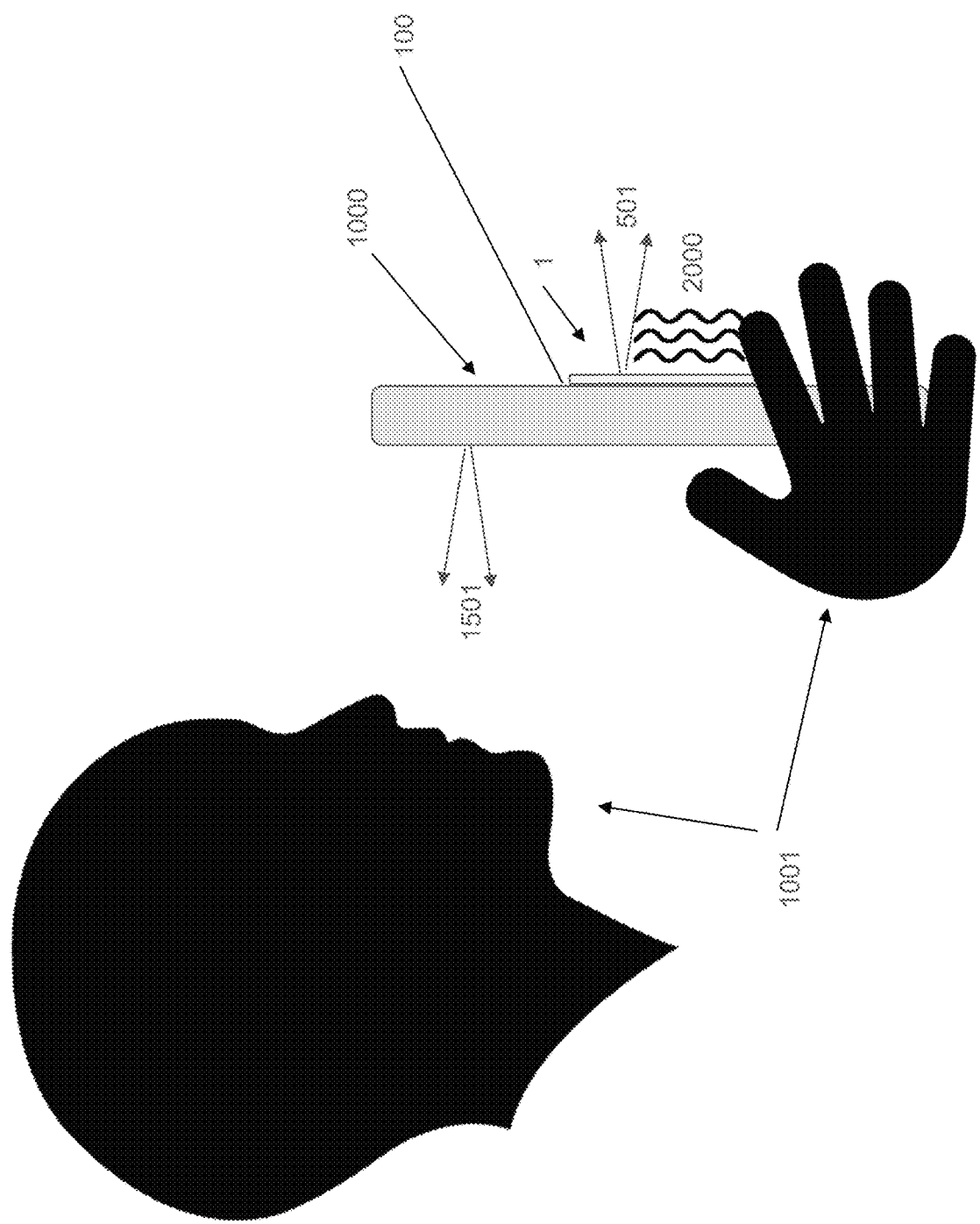
FIG. 9 shows a wireless accessory being used by a user in accordance with illustrative embodiments.

FIG. 9 shows the wireless accessory 1 coupled with the mobile device 1000 (or a case of the mobile device 1000) in accordance with illustrative embodiments. The flashlight wireless accessory 1 is shown in the figure. The user 1001 actively uses the mobile device 1000 including viewing their screen display 1501 in an upright position. The wireless accessory 1 is coupled to the back of the mobile device 1000 using the coupling 100 (a specific coupling mechanism is not shown in the diagram, although any of the aforementioned coupling methods or equivalents thereof may be used). Electromagnetic energy 2000 is transmitted from the mobile device 1000 to the wireless accessory 1 and converted into electrical energy using the receiving coil 200 (not shown). In some embodiments, the wireless accessory 1 converts the electrical energy into visible light 501 inside the functional component 500 (not shown). Because there is no thick battery, the wireless accessory 1 is very thin and lightweight, and therefore, does not disrupt the user's 1100 use of the mobile device 1000. It can be seen in FIG. 9 in conjunction with the described advantages that this system allows for the user 1001 to actively use the mobile device 1000 while also using the wireless accessory 1.

The process then proceeds to step 512, where the user uncouples the accessory 1 from the mobile device 1000, or the case of the mobile device. To that end, the user 1001 may pull the accessory 1 and the mobile device 1000 in opposite directions until a threshold force is overcome (e.g., the force to overcome the magnetic attraction with Apple MagSafe). The user may also conveniently wirelessly charge the mobile device 1000 after the accessory is removed from the device 1000 and/or the case. When the accessory 1 and the mobile device 1000 are uncoupled, the process proceeds to step 514 which asks if other functionality is desired? For example, the user may have first used the accessory 1 with the flashlight functional component 500. If the user desires to use the accessory 1 with the speaker functional component 500, the process returns to step 502, and the user couples the accessory 1 with the mobile device 1000. If not, the process comes to an end.

It should be noted that the method of FIG. 5 is substantially simplified from a longer process that may normally be used. Accordingly, the method shown in FIG. 5 may have many other steps that those skilled in the art likely would use. In addition, some of the steps may be performed in a different order than that shown, or at the same time. Furthermore, some of these steps may be optional in some embodiments. Accordingly, the process is merely exemplary of one process in accordance with illustrative embodiments of the invention. Those skilled in the art therefore can modify the process as appropriate.

For example, in some embodiments, the process may skip step 512. Instead, the process may proceed directly to step 514, which asks if other functionality is desired? If other functionality is desired, a second accessory 1 may be coupled to the phone. In some embodiments, the first accessory 1 may contain a wireless power transmit coil in addition to the wireless power receive coil 200. Or, the wireless power receive coil 200 may be a dual-mode antenna configured to receive and transfer power wirelessly. Accordingly, the accessories 1 may be stackable on one another. In some embodiments, the accessories 1 may have a shape configured to allow the top of one accessory 1 (e.g., a protruding portion of the accessory) to fit snugly within the bottom of another accessory 1 (e.g., a receiving portion, via a friction fit).

It should be appreciated that the various accessories 1 described herein provide improved and/or new functionality compared to mobile devices 1000 currently available. Additionally, the accessories 1 allow the user 1001 to actively use their mobile device 1000 with minimal interference, by providing a thin and lightweight accessory 1. It should be appreciated that the reduced thickness and weight is in part due to the use of wirelessly powering the accessory 1 from the mobile device 1000 itself. By wirelessly powering the accessory 1, the accessory 1 is not hampered by the large size and weight of a battery. However, it should be apparent to one skilled in the art that various embodiments are intended to encompass the accessory 1 including a battery.

Figure 10:
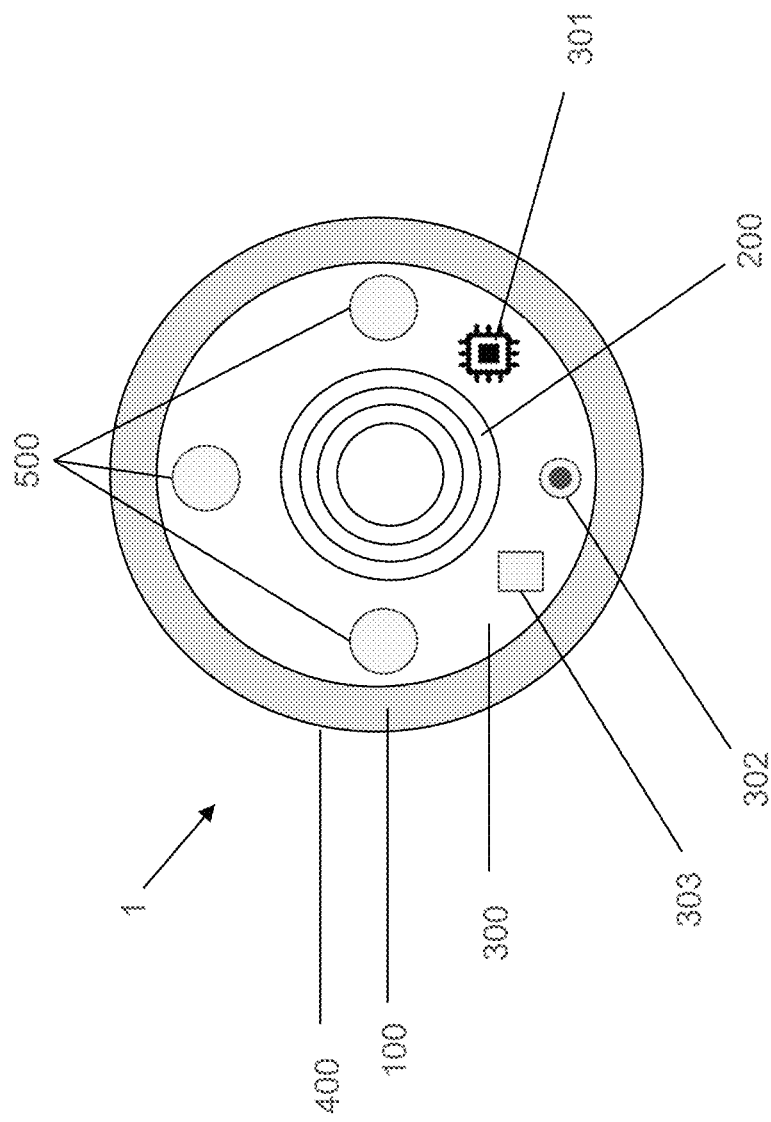
FIG. 10 shows a cutoff top view of a wireless accessory with an energy cache in accordance with illustrative embodiments.

FIG. 10 shows a cutoff top view of an alternative embodiment of the wireless accessory 1 which has an energy cache 303 (e.g., a battery). The primary energy source of the wireless accessory 1 is electromagnetic energy 2000 from the mobile device 1000. However, in some embodiments, it may be advantageous to have a small amount of energy stored in the wireless accessory 1 so it can be removed from the mobile device 1000 or otherwise cut off from the electromagnetic energy 2000 and still be powered on for a short time. Preferably, various embodiments include no battery. However, some embodiments may include a battery, e.g., a battery having a thickness of less than 5 mm to keep the accessory 1 thin.

Figure 11:
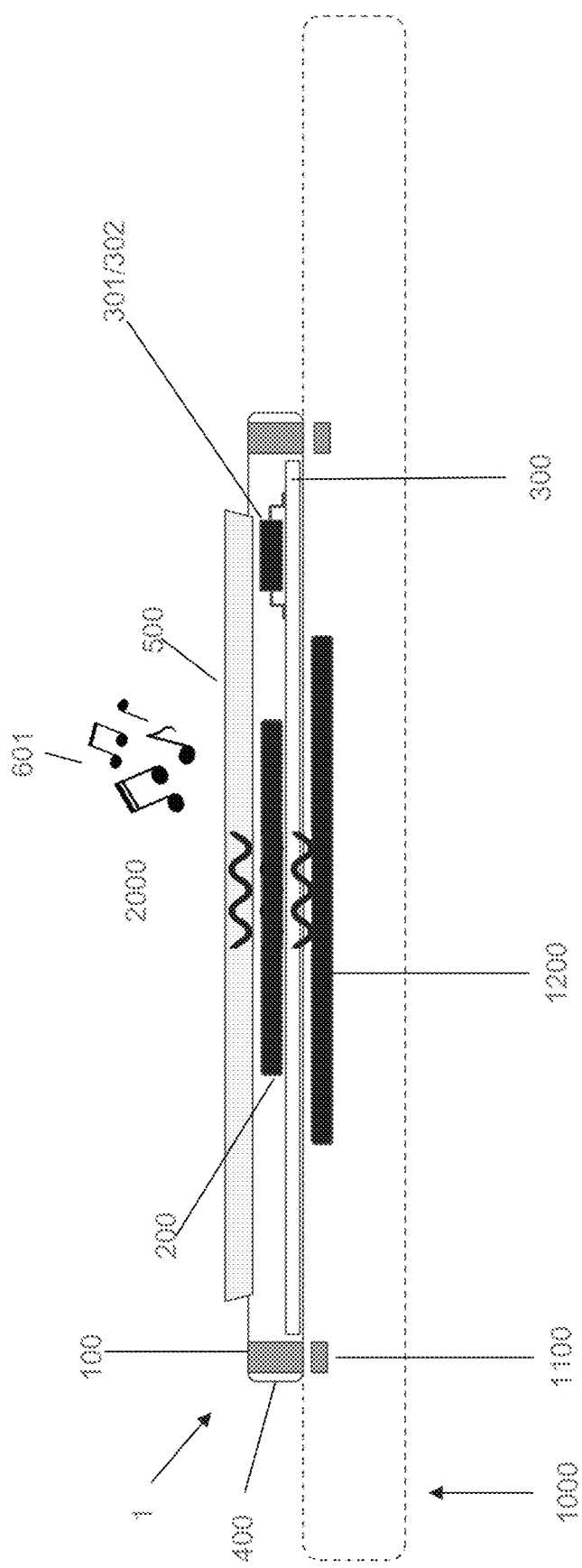
FIG. 11 shows a cutoff side view of an alternative embodiment of a wireless accessory in accordance with illustrative embodiments.

FIG. 11 shows an alternative embodiment of the wireless accessory 1 including a speaker. As shown, the functional component 500 includes a speaker that generates audible sound 601. Otherwise, the wireless accessory 1 embodiment shown in FIG. 11 is very similar in function to the embodiment shown in FIG. 6. In various embodiments, the controller 301 may function both as a digital administrator and a switch 302. For example, the controller 301 may contain wireless Bluetooth technology and therefore, when powered, may act as the singular control for the Wireless accessory being "on" or "off" (i.e. playing sound or not). Accordingly, illustrative embodiments advantageously add one or more electric powered functions to the mobile device 1000.

Although not shown, the mobile device 1000 itself may, in some embodiments, have an external case and/or be plugged into an external power source. To that end, the wireless accessory 1 may include a mechanical interface for receiving a wire (e.g., a thunderbolt connection). Thus, in various embodiments, the wireless accessory 1 may include a wired connection interface (e.g., in addition to the wireless receiver 200). Indeed, the term wireless is intended to refer to the ability of the accessory 1 to receive power wirelessly, and not to imply that various embodiments do not include any wires or cannot include a wired connection.

Although various embodiments refer to a flashlight, it should be understood that the accessory 1 may include a variety of other electronic functions not shown. For example, the accessory 1 may include an air purifier, alarm clock, speaker, digital camera, camera lens, drill, heating element (e.g., electric grill or stove), cooling element, pencil sharpener, electric razor, exhaust fan, external hard drive, fan, game controller (e.g., joystick or handheld controller), printer (e.g., 3D or inkjet), clothing iron, digital scale, microphone, piano keys, display, and/or sensors.

To that end, although not shown in in the figures, various embodiments may include thermal insulation to help prevent propagation of heat generated by the accessory 1 to the mobile device 1000, and vice-versa.

Various embodiments may physically couple with the mobile device 1000 or a case of the mobile device. Advantageously, this allows the user to customize their choice of case (or no case) without being limited to a particular type or style of case. Various embodiments easily attach to the user's existing mobile device 1000 and provide additional functionality. Furthermore, various embodiments provide a very thin profile and reduced weight relative to devices having a large dedicated battery. This provides the advantage of comfort and also, in the case of a smartphone mobile device, reduced risk of the accessory 1 snagging on pockets.

Figure 12A:
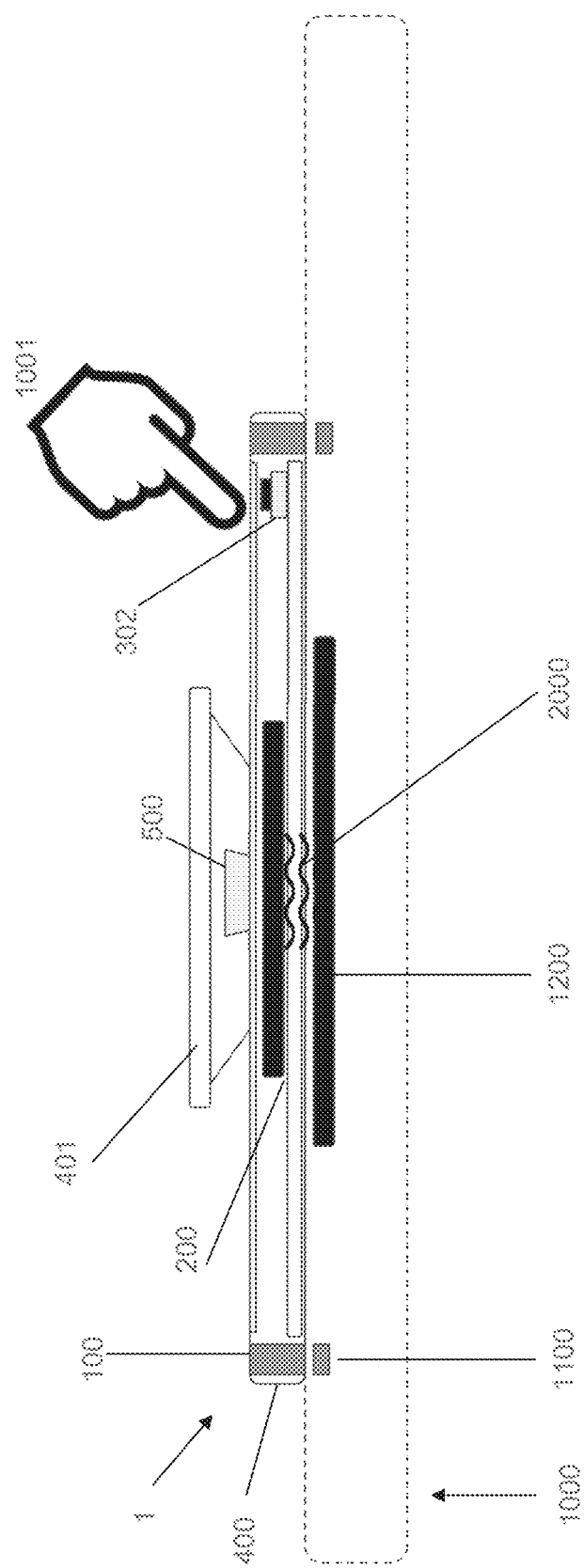
FIG. 12A shows a wireless accessory configured as a mobile device grip and/or stand in accordance with illustrative embodiments.
Figure 12B:
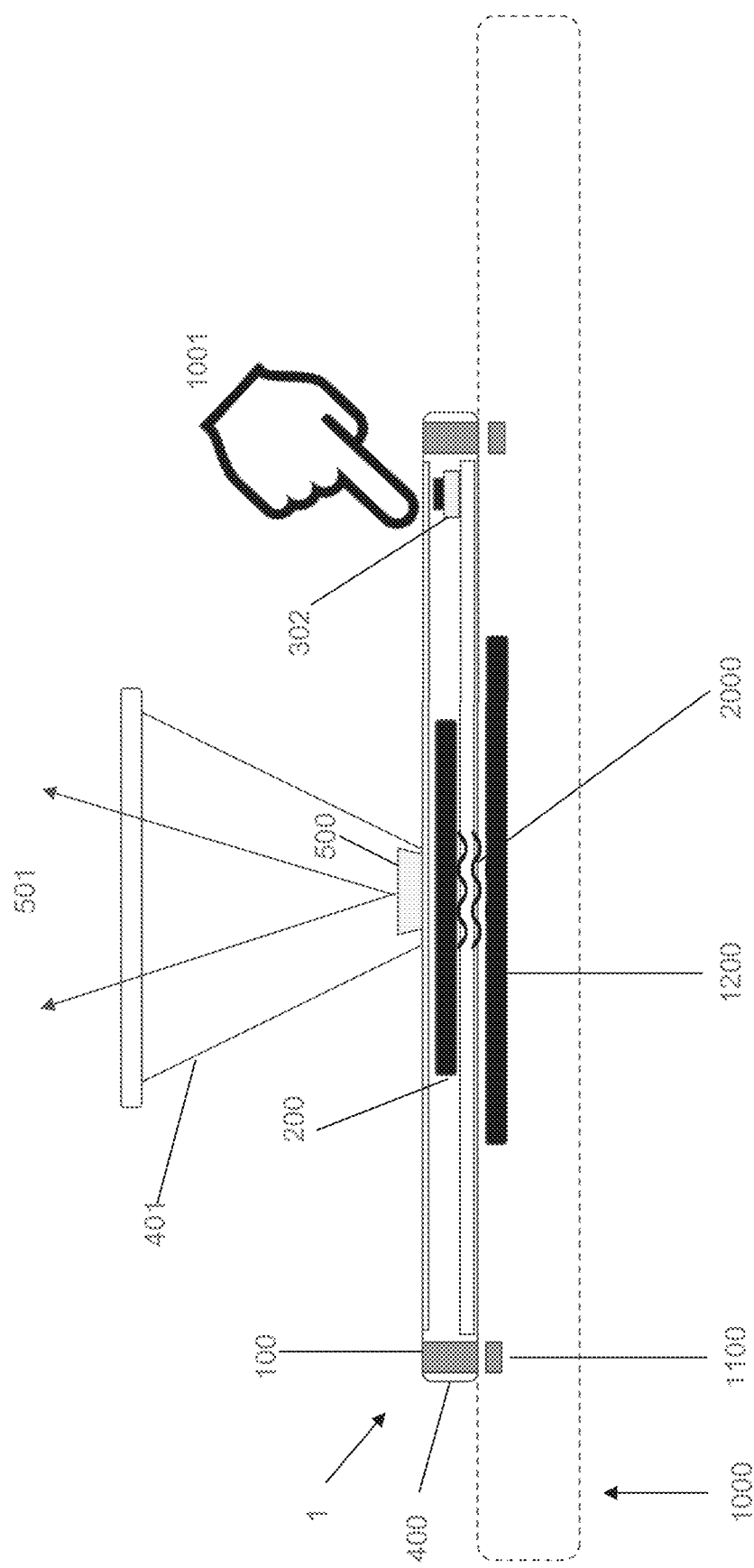
FIG. 12B shows the mobile device grip of FIG. 12A in an expanded position.

FIGS. 12A and 12B illustrate an embodiment of the wireless accessory 1 having a function housing 401 that serves an additional utility mechanical function to the user 1001. In the figures, the function housing 401 is a collapsible phone grip with a functional light component 500 embedded inside. In this embodiment, the light function may work as described, but in addition the phone grip (i.e., the function housing 401) may be used as a convenient and secure grip on the mobile device 1000 and wireless accessory 1. FIG. 12A shows the phone grip in a collapsed position and 12B shows the phone grip in an expanded position. The accessory 1 may be transition between the collapsed position and the expanded position. The accessory 1 may be configured to be thin (e.g., 6 mm or less) in the collapsed configuration.

Figure 13:
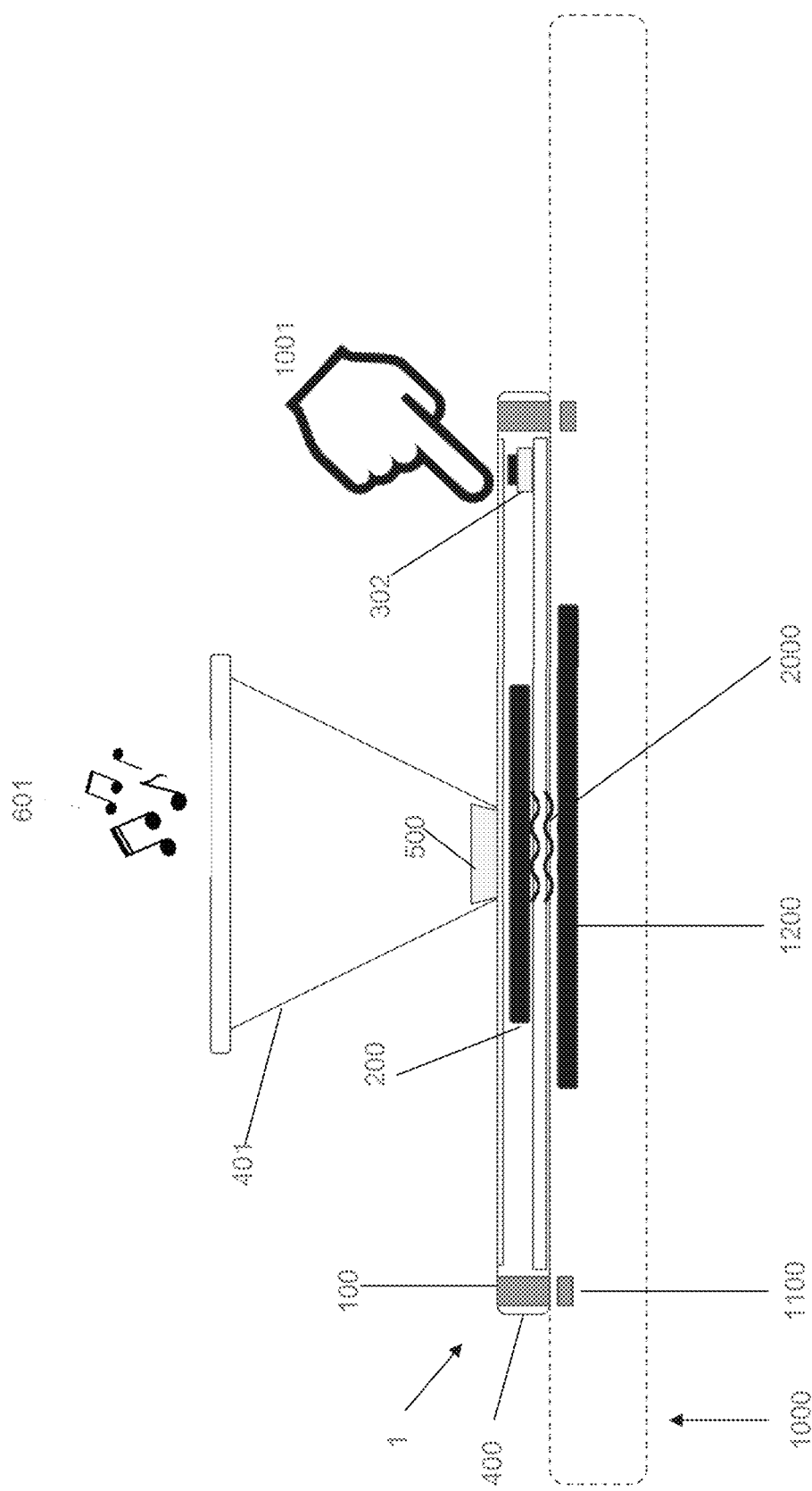
FIG. 13 shows an alternative embodiment of a wireless accessory of FIG. 12B in accordance with illustrative embodiments.

FIG. 13 shows an expanded phone grip (i.e. functional housing 401) similar to FIG. 12B. However, the accessory 1 includes an embedded speaker or sound transducer component. In FIG. 13, the sound component 500 may generate sound by vibrating the functional housing/phone grip 401 or may generate sound independently.

Advantageously, illustrative embodiments may form the function housing 401 from a transparent or translucent material to allow for the light to be seen through housing 401. Additionally, or alternatively, the function housing 401 may include a perforated skin, or other material, for the passage of sound. Additionally, some embodiments may not include the function housing 401 and/or the function housing 401 may not necessarily fully enclose the functional component 500.

Various embodiments may include an expansion mechanism within the accessory 1. The expansion mechanism is preferably thin, such as with the expansion mechanism described in U.S. patent application Ser. No. 17/507,739 for a Mobile Device Grip and Stand, which is incorporated herein by reference in its entirety. Additionally, or alternatively the function housing 401 may include an outer elastomeric skin. The elastomer skin can also be referred to as an accordion, a skin, an expanding and contracting cover, or a cover.

Various embodiments refer to coupling the accessory 1 with the mobile device 1000. It should be understood that discussion of coupling with the mobile device 1000 is intended to include coupling with a case of the mobile device 1000, and vice-versa.

One skilled in the art will appreciate that various embodiments described herein provides a number of advantages. For example, the accessory 1 may advantageously by very thin due to non-requirement of battery (even if a small one is added optionally). Additionally, the accessory 1 may be easily add or remove functionality to any mobile device, as needed. Furthermore, illustrative embodiments are removable from the case and/or the mobile device 100, and therefore, the thickness is not permanently built into the case. Furthermore, the functional component 500 could be removed, supplemented, and/or changed. Additionally, various embodiments of the wireless accessory 1 are detachable from the mobile device 1000 and/or the case, which enables the user to remove the accessory 1 in order to wirelessly charge the device 1000 (with or without a case). It should also be appreciated that the functional component 500 can be used while the phone is also in use, as opposed to just performing a function when the phone is laying on a table plugged into power.

One skilled in the art will realize the embodiments described herein may be embodied in other specific forms without departing from the spirit or essential characteristics thereof. The foregoing embodiments are therefore to be considered in all respects illustrative rather than limiting of the embodiments described herein.

Figure 14:
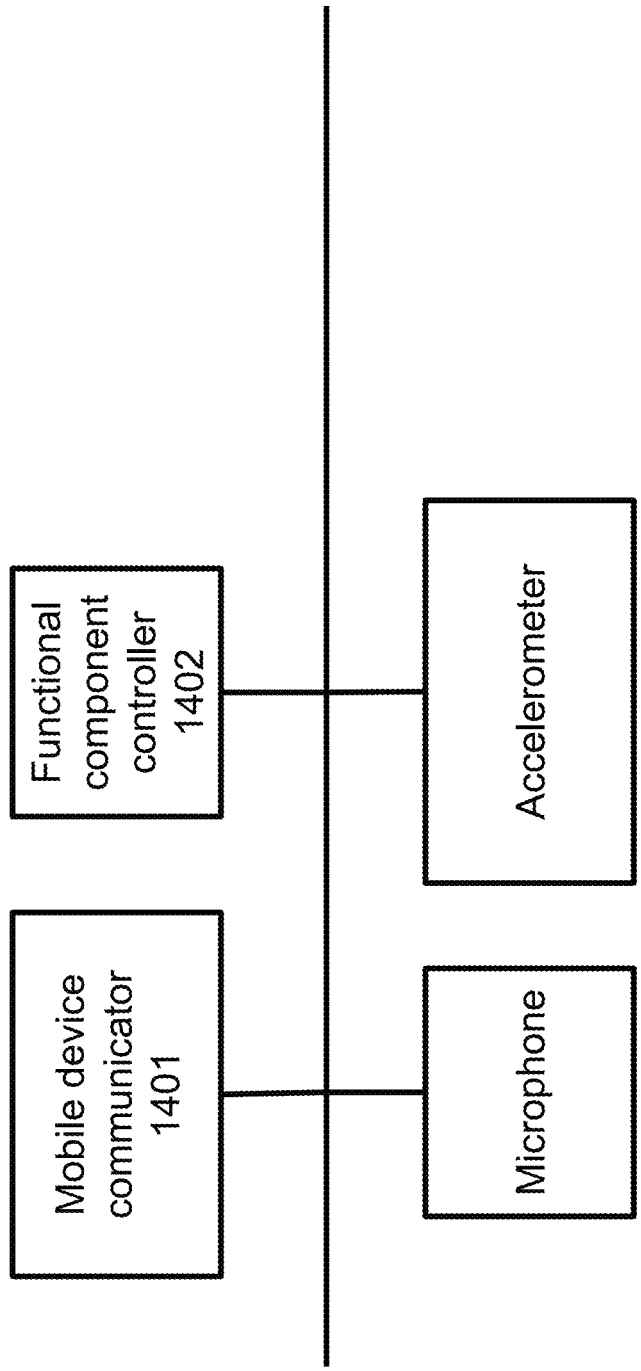
FIG. 14 schematically shows details of the accessory controller of FIG. 1B configured in accordance with illustrative embodiments of the invention.

FIG. 14 schematically shows details of the accessory controller 301 of FIG. 1B configured in accordance with illustrative embodiments of the invention. The controller 301 may include a mobile device communicator 1401. The communicator may include hardware and/or software appropriate for a Bluetooth connection, wired, or wireless (e.g., internet) connection with the mobile device 1000. The user may communicate with and control various operations of the controller 301 via the communicator 1401 (e.g., via an interface on a smartphone application).

A functional component controller 1402 is configured to control the operation of the functional component 500. As described previously, various external triggers may be used to control the operation of the accessory 1. For example, the functional component controller 1402 may be configured to cause the functional component 500 to light up a first color upon receiving a text message from a first person, a second color upon receiving a text message from a second person, etc. (e.g., blue for dad, red for mom, pink for significant other, etc.). Additionally, the functional component controller 1402 may adjust the output of the functional component 500. For example, the brightness, volume, sound, music, speed, or other output of the functional component 500. The user 1001 may adjust the various output settings through the mobile device 1000 via the mobile device communicator 1401.

Each of these components is operatively connected by any conventional interconnect mechanism. FIG. 14 simply shows a bus communicating each the components. Those skilled in the art should understand that this generalized representation can be modified to include other conventional direct or indirect connections. Accordingly, discussion of a bus is not intended to limit various embodiments.

Indeed, it should be noted that FIG. 14 only schematically shows each of these components. Those skilled in the art should understand that each of these components can be implemented in a variety of conventional manners, such as by using hardware, software, or a combination of hardware and software, across one or more other functional components. For example, the controller 301 (discussed in detail below) may be implemented using a plurality of microprocessors executing firmware. As another example, the controller 301 may be implemented using one or more application specific integrated circuits (i.e., "ASICs") and related software, or a combination of ASICs, discrete electronic components (e.g., integrated circuits), and microprocessors. Accordingly, the representation of the controller 301 and other components in a single box of FIG. 14 is for simplicity purposes only. In fact, in some embodiments, the controller of FIG. 14 is distributed across a plurality of different components—not necessarily within the same housing or chassis.

It should be reiterated that the representation of FIG. 14 is a significantly simplified representation of an actual accessory controller 301. Those skilled in the art should understand that such a device may have other physical and/or functional components, such as central processing units, other packet processing modules, a microphone, accelerometer, and short-term memory. Accordingly, this discussion is not intended to suggest that FIG. 14 represents all of the elements of the accessory controller 301. In fact, much of what was said here with regard to FIG. 14 can also be applied to other components of the accessory 1 of FIG. 1B.

In some implementations, the controller 301 includes one or more processors (or one or more processor cores) that each are configured to perform a series of instructions that result in manipulated data and/or control the operation of the other components of the controller 301. In some implementations, when executing a specific process (e.g., changing an integrated light pattern or sound based on a received signal from the mobile device), the processor can be configured to make specific logic-based determinations based on input data received, and be further configured to provide one or more outputs that can be used to control or otherwise inform subsequent processing to be carried out by the processor and/or other processors or circuitry with which is processor is communicatively coupled. Thus, the processor may react to specific input stimulus in a specific way and generate a corresponding output based on that input stimulus. In some example cases, the processor can proceed through a sequence of logical transitions in which various internal register states and/or other bit cell states internal or external to the processor may be set to logic high or logic low. As referred to herein, the processor can be configured to execute a function where software is stored in a data store coupled to the processor, the software being configured to cause the processor to proceed through a sequence of various logic decisions that result in the function being executed. The various components that are described herein as being executable by the processor can be implemented in various forms of specialized hardware, software, or a combination thereof. For example, the processor can be a digital signal processor (DSP) such as a 24-bit DSP processor. The processor can be a multi-core processor, e.g., having two or more processing cores. The processor can be an Advanced RISC Machine (ARM) processor such as a 32-bit ARM processor. The processor can execute an embedded operating system, and include services provided by the operating system that can be used for file system manipulation, display & audio generation, basic networking, firewalling, data encryption and communications.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, programmable analog circuitry, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

As used in this specification and the claims, the singular forms "a," "an," and "the" refer to plural referents unless the context clearly dictates otherwise. For example, reference to "the accessory" in the singular includes a plurality of accessories, and reference to "the functional component" in the singular includes one or more functional components and equivalents known to those skilled in the art. Thus, in various embodiments, any reference to the singular includes a plurality, and any reference to more than one component can include the singular.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein.

It is, therefore, to be understood that the foregoing embodiments are presented by way of example only and that, within the scope of the appended claims and equivalents thereto, inventive embodiments may be practiced otherwise than as specifically described and claimed. Illustrative embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually is inconsistent, is included within the inventive scope of the present disclosure. Disclosed embodiments, or portions thereof, may be combined in ways not listed above and/or not explicitly claimed. Thus, one or more features from variously disclosed examples and embodiments may be combined in various ways. For example, it is to be understood that the present disclosure contemplates that, to the extent possible, one or more features of any embodiment can be combined with one or more features of any other embodiment.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the above discussion discloses various exemplary embodiments of the invention, it should be apparent that those skilled in the art can make various modifications that will achieve some of the advantages of the invention without departing from the true scope of the invention.

What is claimed is:

1. A method of using a mobile accessory, the method comprising:
   providing a mobile device positioned in a case, the mobile device having a wireless power transmitter, the case having a magnetically attractive portion;
   providing a mobile accessory having a magnetic coupling portion and a wireless power receiver, the mobile accessory having a functional component;
   coupling the accessory with the case such that the wireless power transmitter of the mobile device is positioned to transfer wireless power to the wireless power receiver of the accessory;
   transferring power wirelessly from the mobile device to the accessory; and
   activating the functional component of the accessory while power is transferred wirelessly and while the accessory is coupled with the case of the mobile device.

2. The method of claim 1, wherein the functional component includes a sound transducer.

3. The method of claim 1, wherein the functional component includes an LED.

4. The method of claim 1, wherein coupling the accessory with the case includes coupling the magnetic coupling portion with the magnetically attractive portion.

5. The method of claim 1, wherein activating the functional component of the accessory further comprises a user selecting to activate the functional component.

6. The method of claim 1, wherein the accessory has a thickness of less than 10 millimeters.

7. The method of claim 1, further comprising:
   using the mobile device normally while the functional component of the accessory is activated.

8. The method of claim 1, wherein activating the functional component of the accessory requires between 0.25 Watts and 20.00 Watts.

9. The method of claim 1, wherein the mobile device is a smartphone device.

10. A mobile accessory comprising:
    a magnetic coupling portion configured to couple with a magnetically attractive portion of a case of a mobile device;
    a wireless power receiver configured to be positioned relative to a wireless power transmitter of the mobile device when the magnetic coupling portion is coupled with the magnetically attractive portion of the case, such that the wireless power receiver receives wireless power from the mobile device; and
    a functional component that is activated while the wireless power receiver receives the wireless power from the mobile device.

11. The mobile accessory of claim 10, wherein the functional component includes a plurality of LEDs.

12. The mobile accessory of claim 10, wherein the functional component is powered by the wireless power.

13. The mobile accessory of claim 10, wherein the functional component has a power rating between 0.25 watts and 20 watts.

14. The mobile accessory of claim 10, wherein the accessory is batteryless.

15. The mobile accessory of claim 10, further comprising a battery of less than 100 mAh.

16. A mobile accessory comprising:
    a coupling portion configured to physically couple and uncouple with a mobile device or a case of a mobile device;
    a wireless power receive coil configured to receive wireless power from the mobile device; and
    a functional component configured to perform a function, wherein the functional component performs the function while coupled and receiving wireless power from the mobile device,
    wherein the mobile accessory is batteryless.

17. The mobile accessory of claim 16, wherein the accessory is configured to magnetically couple with the mobile device.

18. The mobile accessory of claim 16, wherein the accessory is configured to stick to the mobile device or a case of the mobile device with an adhesive.

19. The mobile accessory of claim 16, wherein the accessory is configured to mechanically attach to the mobile device or a case of the mobile device.

20. The mobile accessory of claim 16, wherein the accessory has a thickness of less than 6 mm.

21. The mobile accessory of claim 16, wherein the mobile device is a smartphone device.

* * * * *